United States Patent
Hsieh et al.

(10) Patent No.: US 8,761,120 B2
(45) Date of Patent: Jun. 24, 2014

(54) METHOD OF HANDLING CELL CHANGE IN WIRELESS COMMUNICATION SYSTEMS AND COMMUNICATION DEVICE THEREOF

(75) Inventors: Chwu-Wuang Hsieh, New Taipei (TW); Cheng-Ying Hsieh, New Taipei (TW); Kuo-Hao Hung, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 115 days.

(21) Appl. No.: 13/423,287

(22) Filed: Mar. 19, 2012

(65) Prior Publication Data

US 2012/0243504 A1 Sep. 27, 2012

(30) Foreign Application Priority Data

Mar. 24, 2011 (TW) .............................. 100110096 A (51) Int. Cl.
*H04W 36/00* (2009.01)
(52) U.S. Cl.
USPC ............................. 370/331; 455/443; 455/444
(58) Field of Classification Search
USPC .......... 370/328–331; 445/436, 437, 439, 440, 445/443, 444
See application file for complete search history.

(56) References Cited

U.S. PATENT DOCUMENTS

2009/0075666 A1* 3/2009 Makhijani et al. ............ 455/450

OTHER PUBLICATIONS

Office action mailed on Nov. 15, 2013 for the Taiwan application No. 10011096, filing date: Mar. 24, 2011, p. 1, line 6-14, p. 2-4 and p. 5 line 1-17.

* cited by examiner

*Primary Examiner* — Kerri Rose
(74) *Attorney, Agent, or Firm* — Winston Hsu; Scott Margo (57) ABSTRACT

A method of handling cell change for a mobile device employing a high speed downlink package access (HSDPA) technology in wireless communication systems. The method includes initiating a handover procedure to change a serving cell of the mobile device when the mobile device moves from a HSDPA cell into another HSDPA cell, performing a physical channel reconfiguration procedure from a high speed physical downlink shared channel (HS-PDSCH) to a dedicated physical data channel (DPDCH), wherein the physical channel reconfiguration procedure is initiated via a Radio Network Controller (RNC), and performing the handover procedure.

21 Claims, 10 Drawing Sheets

METHOD OF HANDLING CELL CHANGE IN WIRELESS COMMUNICATION SYSTEMS AND COMMUNICATION DEVICE THEREOF

BACKGROUND OF THE INVENTION

1. Field of the Invention

The present invention relates to a method for a wireless communication system and a communication device thereof, and more particularly, to a method for handling cell change in the wireless communication system, and the communication device thereof.

2. Description of the Prior Art

Third Generation (3G) mobile communication technologies employ Wideband Code Division Multiple Access (WCDMA) to provide a high spectrum utilization efficiency, wide coverage and high quality, high speed multimedia data transmission. In the 3G mobile communication system, a user may use wireless communication devices (e.g. mobile phone) to perform real time video communication, Conference Calls, real time gaming, music streaming, and to send/receive E-mail, etc. However, these functionalities depend on a fast and real time data transmission. Therefore, to enhance WCDMA technology, the prior art provides a High Speed Packet Access (HSPA) system, including High Speed Downlink Package Access (HSDPA) technology and High Speed Uplink Package Access (HSUPA) technology, to increase bandwidth utilization efficiency and processing rates of packet data, to improve uplink and downlink transmission speeds.

Figure 1:
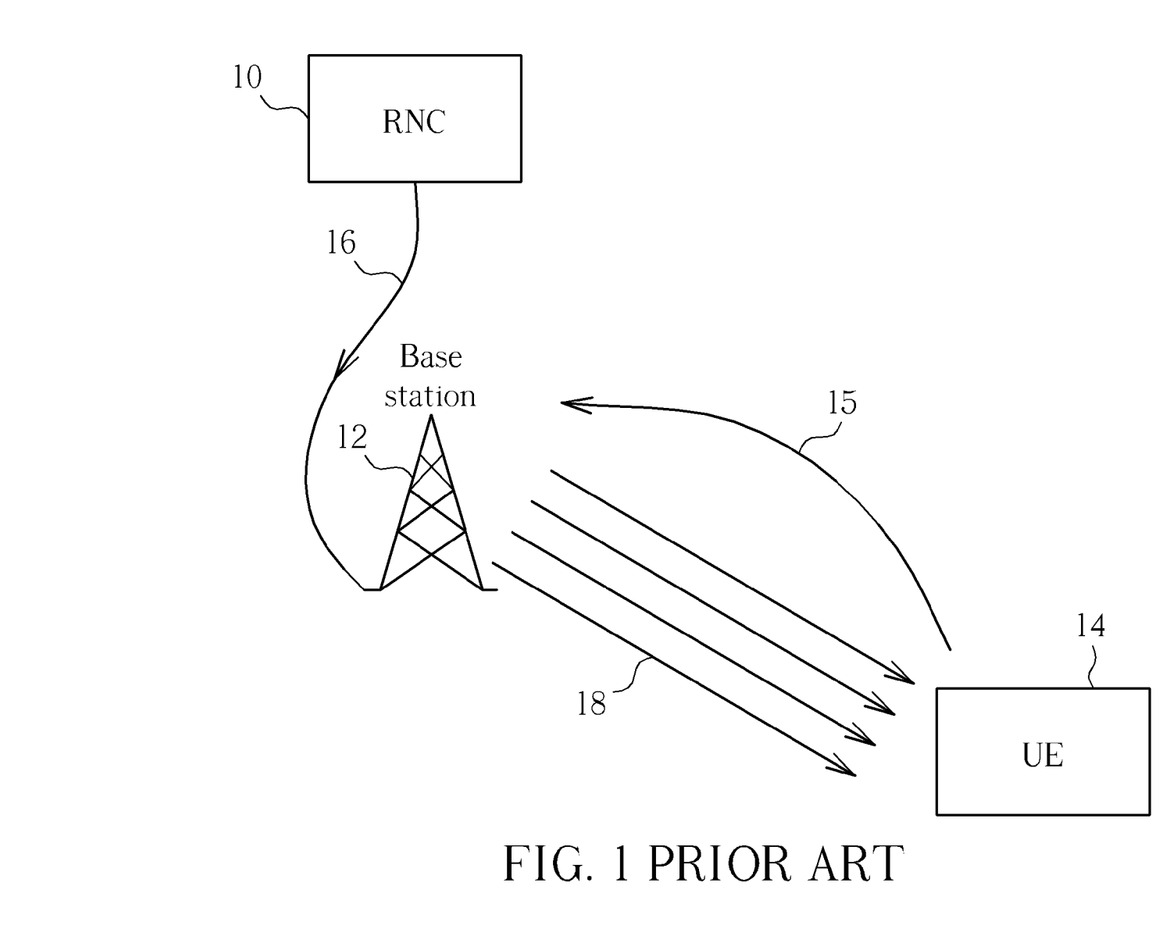
FIG. 1 is a schematic diagram of a conventional HSDPA system.

Please refer to FIG. 1, which is a schematic diagram of a conventional HSDPA system. The Radio Network Controller (RNC) 10 may connect to multiple base stations (Node Bs) 12, and communicate with the base station 12 via an Iub interface 16. The base station 12 may transmit data from the RNC 10 to a User Equipment (UE) 14. In the UE 14, a physical layer may receive physical data from the base station 12 via a High Speed Physical Downlink Shared Channel (HS-PDSCH) 18, and return (upload) information such as Acknowledgement/Negative Acknowledgement (ACK/NACK) and Channel Quality Identifier (CQI) via a High Speed Physical Control Channel (HS-DPCCH) 15. On the other hand, in the base station 12, a medium access control layer utilizes a medium access control high speed entity (MAC-hs Entity) to manage functionalities such as packet scheduling, data rate adaptation and Hybrid Automatic Repeat Request (HARQ), etc.

Figure 2:
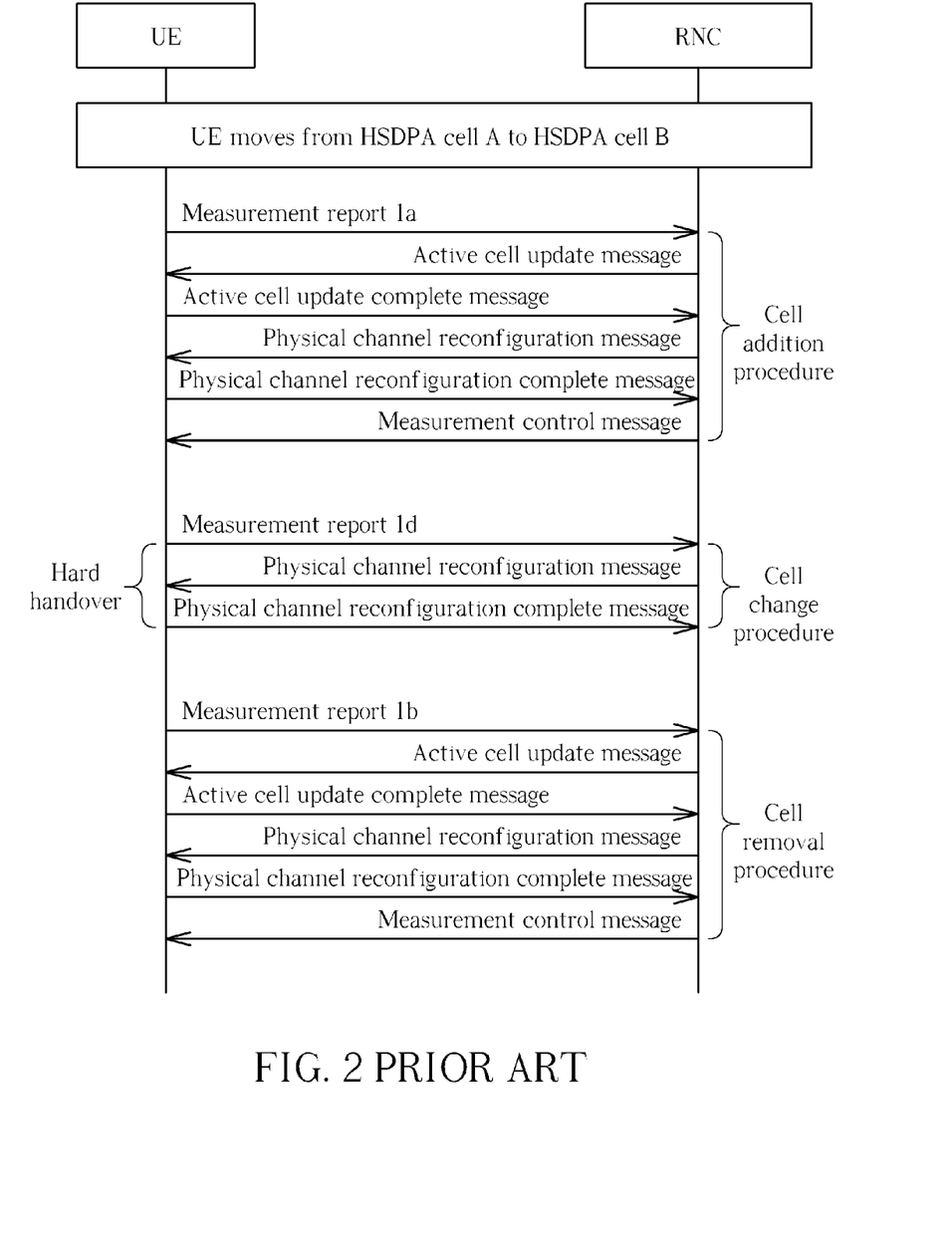
FIG. 2 is a sequence diagram of a conventional cell change procedure with RRC signaling.

Please refer to FIG. 2, which is a sequence diagram of a cell change procedure with Radio Resource Control (RRC) signaling according to the prior art. The UE connects to an HSDPA cell A, to receive services provided by the cell A (e.g. mobile originating call or mobile terminating call services). When the UE moves from the cell A to another HSDPA cell B (i.e. the UE detects the strength of a signal from the cell A is gradually decreasing, whereas the strength of a signal from the cell B is increasing), and detects that signal strengths from the cell B reach a certain level, the UE transmits a measurement report 1$a$ to the RNC, and the RNC initiates a cell addition procedure corresponding to the cell B, according to the measurement report 1$a$. During the cell addition procedure, the RNC transmits an active cell update message to the UE, to add the cell B to an active set of the UE, wherein the active set is a set of cells communicating with the UE. After adding the cell B to its active set, the UE responds with an active cell update complete message to the RNC. Next, the RNC transmits a Physical channel Reconfiguration message to the UE, to establish a physical channel corresponding to the cell B. After completing physical channel establishment, the UE responds with a Physical channel Reconfiguration complete message to the RNC. Finally, the RNC transmits a Measurement control message to the UE, to update a neighbor list information in the UE.

After completion of the cell addition procedure corresponding to the cell B, the UE transmits a measurement report 1$d$ to the RNC, to request a handover from the cell A to the cell B, to change a serving cell of the UE. Therefore, after receiving the measurement report 1$d$ from the UE, the RNC transmits a physical channel reconfiguration message to the UE, to reconfigure a physical channel of the UE to a physical channel corresponding to the cell B. After completion of the physical channel reconfiguration, the UE transmits a physical channel reconfiguration complete message to the RNC to complete the serving cell change. Note that, changing of a serving cell is implemented via a handover procedure, as will be familiar to those with general skills in the art, and is not iterated here.

Furthermore, after completing serving cell change, the UE transmits a measurement report 1$b$, to request the RNC to initiate a cell removal procedure corresponding to the cell A. During the cell removal procedure, the UE receives an active cell update message from the RNC, to remove the cell A from its active set. After removing the cell A from its active set, the UE transmits an active cell update complete message to the RNC. Next, the RNC transmits a physical channel reconfiguration message, to release a physical channel between the UE and the cell A. After receiving the physical channel reconfiguration complete message, the RNC transmits a measurement control message to the UE, to update the neighbor list information of the UE.

As mentioned above, serving cell change of the UE is implemented via a handover procedure. When cells A and B belong to different base stations, the handover procedure performed by the UE is an inter Node B handover procedure. Moreover, the handover procedure can be a hard handover or a soft handover. In an HSDPA system, data over the HS-PDSCH is managed via the MAC-hs Entity in the base station; therefore, an HSDPA system only supports hard handover. In more detail, when the UE performs the cell change procedure via hard handover, each base station independently manages the HS-PDCH. Thus, during hard handover, the UE does not concurrently receive a same data transmitted from a serving base station and a target base station, but only receives data transmitted from the target base station. Conversely, during soft handover, the UE may concurrently receive data from the serving base station and the target base station.

Further, in an HSDPA system, the base stations have a buffer to store data transmit from the RNC to the UE. As mentioned above, since an HSDPA system does not support soft handover, when the UE performs serving cell change via hard handover, the UE can only receive data from the target Node B. However, the original serving base station may still have remaining data to transmit to the UE. As such, data loss or data re-transmission may occur, thus prolonging data transmission time.

Figure 3:
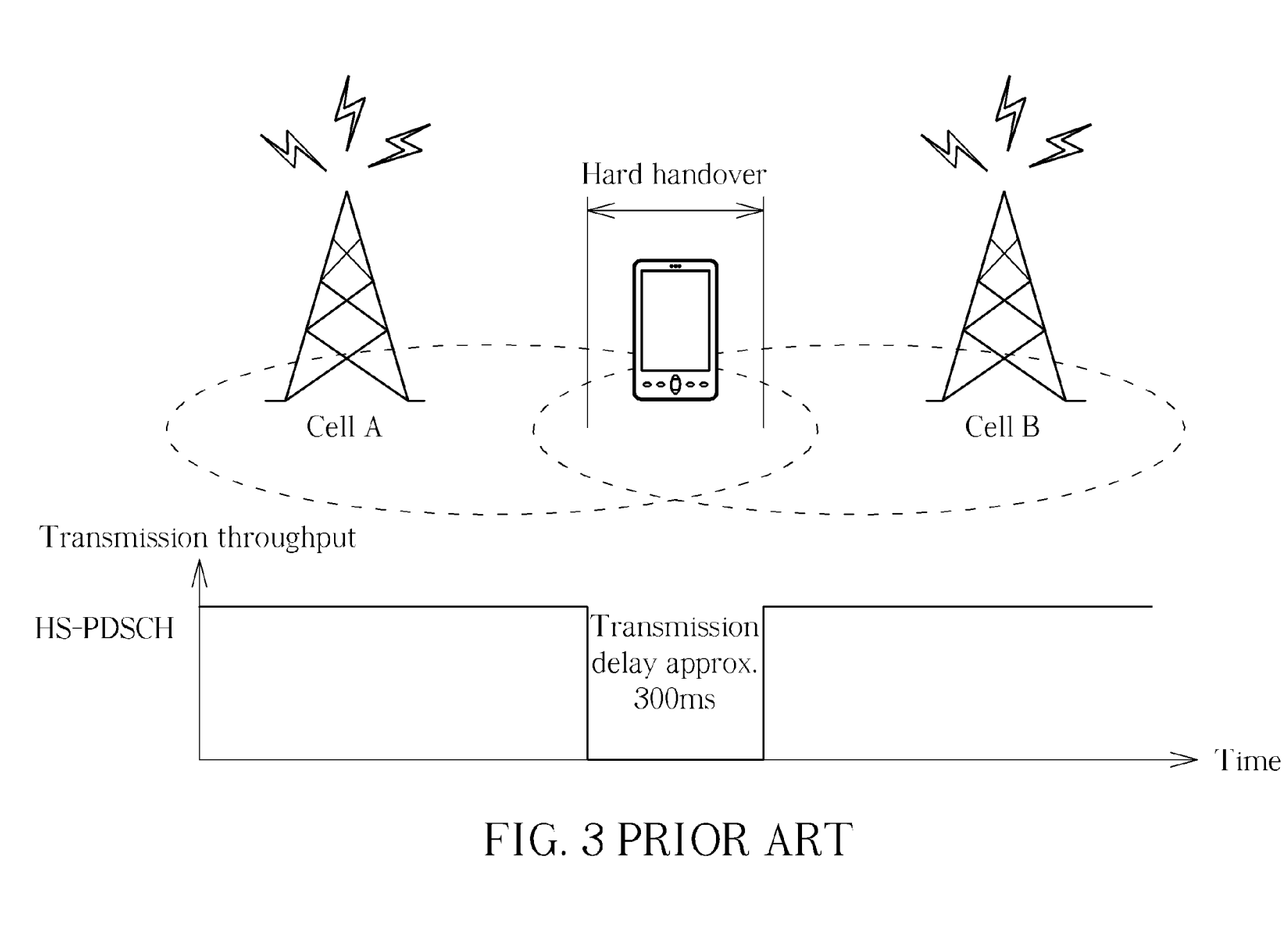
FIG. 3 is a schematic diagram of a relationship between transmission throughput and time during a conventional hard handover procedure.

Moreover, when the UE performs the cell change procedure via hard handover, discontinuation of data transmission occurs. Please refer to FIG. 3, which is a schematic diagram of a relationship between transmission throughput and time during conventional hard handover procedure. As shown in FIG. 3, during hard handover, data transmission throughput over the HS-PDSCH is 0, and data transmission delay caused by the hard handover is about 300 ms, severely undermining real time services for the UE, e.g. Voice over Internet Protocol (VoIP) or Video Telephony over IP, and lowers communication quality.

SUMMARY OF THE INVENTION

Therefore, the present invention provides a method for handling cell change in a wireless communication system and communication device thereof, to solve the above-mentioned problems.

A method for handling cell change in a wireless communication system employing HSDPA is disclosed. The method includes initiating a handover procedure to change a serving cell of a mobile device when the mobile device moves from a first HSDPA cell into a second HSDPA cell, performing a first physical channel reconfiguration procedure from a High Speed Physical Downlink Shared Channel (HS-PDSCH) to a Dedicated Physical Data Channel (DPDCH), wherein the first physical channel reconfiguration procedure is initiated via a Radio Network Controller (RNC) of the wireless communication system, and performing the handover procedure.

A wireless communication system employing High Speed Downlink Package Access (HSDPA) technology is disclosed. The wireless communication system includes a computer readable storage medium, for storing a program code pertaining corresponding to a process, and a processor, coupled to the computer readable storage medium, for processing the program code to execute the process, wherein the process includes initiating a handover procedure to change a serving cell of a mobile device when the mobile device moves from a first HSDPA cell into a second HSDPA cell, performing a first physical channel reconfiguration procedure from a High Speed Physical Downlink Shared Channel (HS-PDSCH) to a Dedicated Physical Data Channel (DPDCH), wherein the first physical channel reconfiguration procedure is initiated via a Radio Network Controller (RNC) of the wireless communication system; and performing the handover procedure.

A wireless communication system employing HSDPA technology is disclosed. The wireless communication system includes a handover initiation device, for initiating a handover procedure to change a serving cell of a mobile device when the mobile device moves from a first HSDPA cell into a second HSDPA cell, a first channel reconfiguration device, for performing a first physical channel reconfiguration procedure from a High Speed Physical Downlink Shared Channel (HS-PDSCH) to a Dedicated Physical Data Channel (DPDCH), wherein the first physical channel reconfiguration procedure is initiated via a Radio Network Controller (RNC) in the wireless communication system, and a cell change device, for performing the handover procedure.

A method for handling cell change for a Radio Network Controller (RNC) in a wireless communication system employing HSDPA technology is disclosed. The method includes initiating a physical channel reconfiguration procedure from a High Speed Physical Downlink Shared Channel (HS-PDSCH) to a Dedicated Physical Data Channel (DPDCH) for the mobile device, wherein the measurement report is associated to the mobile device entering a cell employing the HSDPA technology, when receiving a measurement report from a mobile device of the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
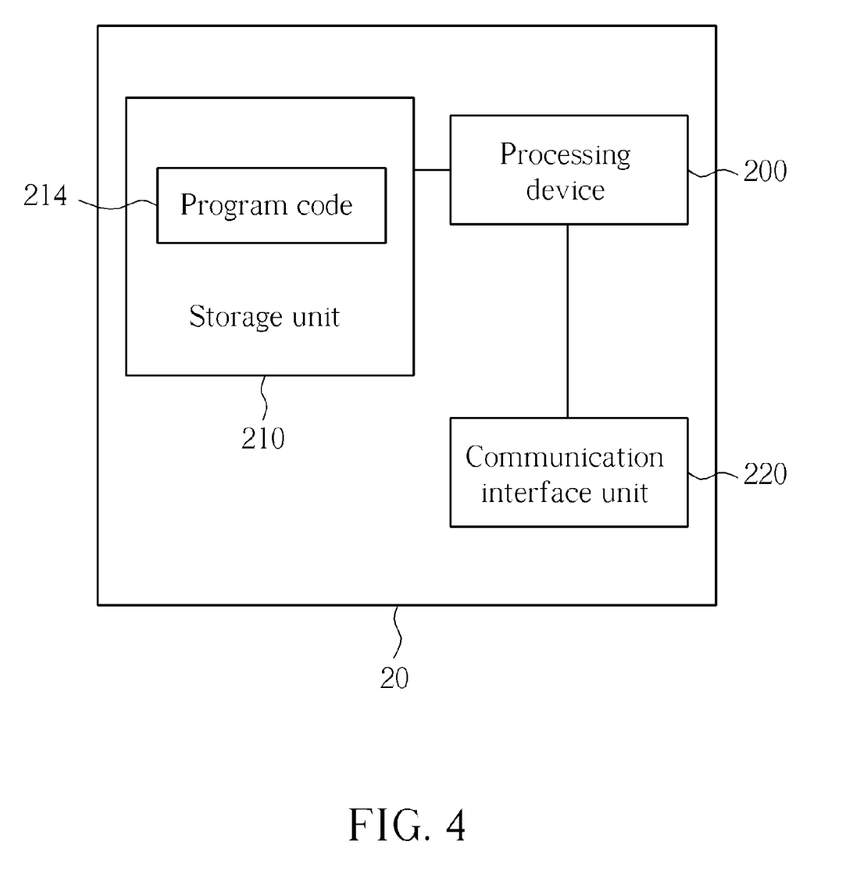
FIG. 4 is a schematic diagram of a communication device according to an embodiment of the present invention.

Please refer to FIG. 4, which is a schematic diagram of a communication device 20 according to an embodiment of the present invention. The communication device 20 can be a mobile device (e.g. a User Equipment, UE), or a network terminal (e.g. a Radio Network Controller, RNC). The communication device 20 is utilized in a Third Generation (3G) mobile communication system, and supports High-Speed Downlink Packet Access (HSDPA) technology. The communication device 20 includes a processing device 200, a storage unit 210, and a communication interface unit 220. The processing device 200 may be a micro-processor or an application-specific integrated circuit (ASIC). The storage unit 210 is used for storing a program code 214, and may be any kind of data storage device. The program code 214 is read and executed via the processing device 200. For example, the storage unit 210 may be a subscriber identity module (SIM), read-only memory (ROM), random-access memory (RAM), compact disk (CD-ROM), magnetic tape, floppy disk, optical data storage device, etc, but not limited to the above. The communication interface unit 220 may be a wireless transceiver, which performs wireless communication with the network or the UE according to processing results of the processing device 200.

Figure 5:
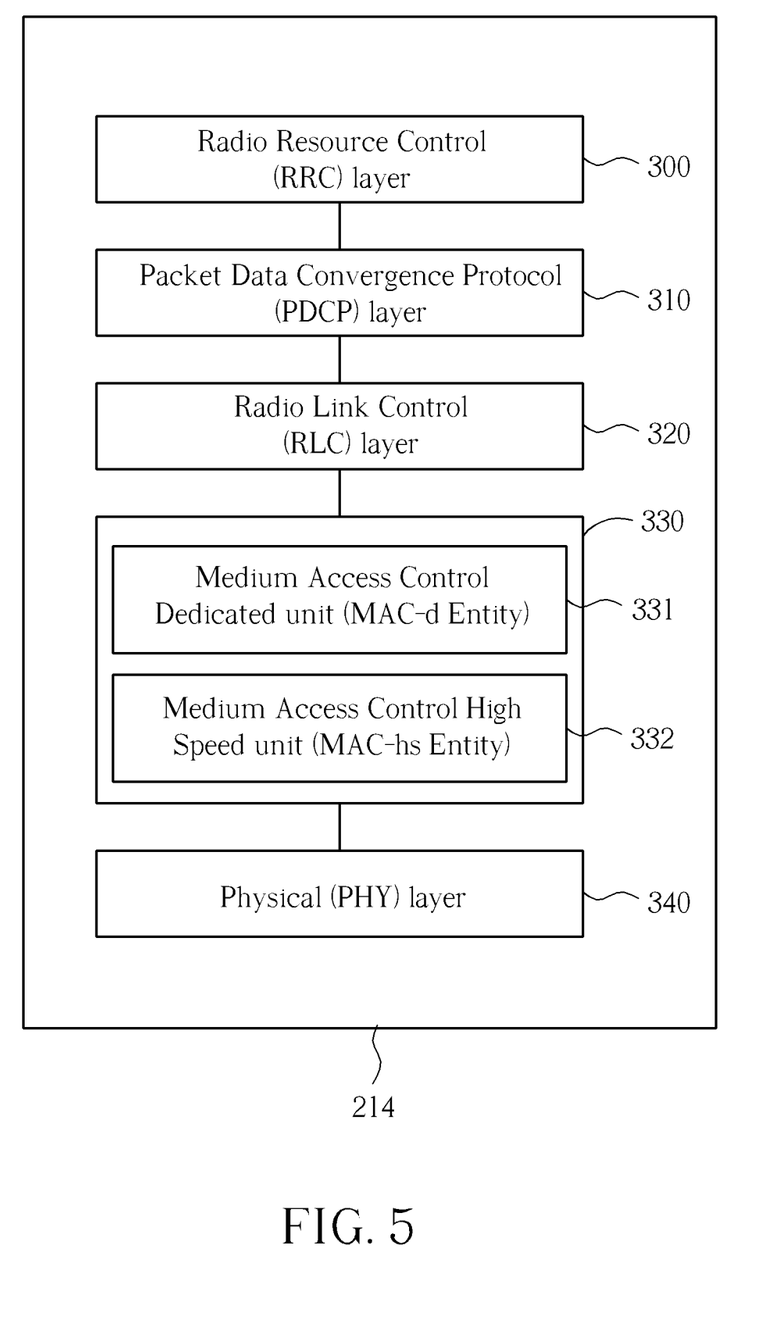
FIG. 5 is a schematic diagram of a communication protocol stack of a communication device according to an embodiment of the present invention.

Please refer to FIG. 5, which is a schematic diagram of a communication protocol stack of the communication device 20 as a UE. Operations of the communication protocol stack may be defined in the program code 214, and executed via the processing device 200. From top to bottom, the communication protocol stack includes a Radio Resource Control (RRC) layer 300, a Packet Data Convergence Protocol (PDCP) layer 310, a Radio Link Control (RLC) layer 320, a Medium Access Control (MAC) layer 330, and a Physical (PHY) layer 340. The RRC layer 300 further includes a Medium Access Control Dedicated unit (MAC-d Entity) 331 and a Medium Access Control High Speed unit (MAC-hs Entity) 332. The MAC-d Entity 331 is utilized to manage a Dedicated Physical Data Channel (DPDCH), and the MAC-hs Entity 332 is utilized to manage a High Speed Physical Downlink Shared Channel (HS-PDSCH). Functionalities of the RRC layer include RRC connection management, measurement control, handover procedure control, and Radio Bearers (RB) control, etc.

Figure 6:
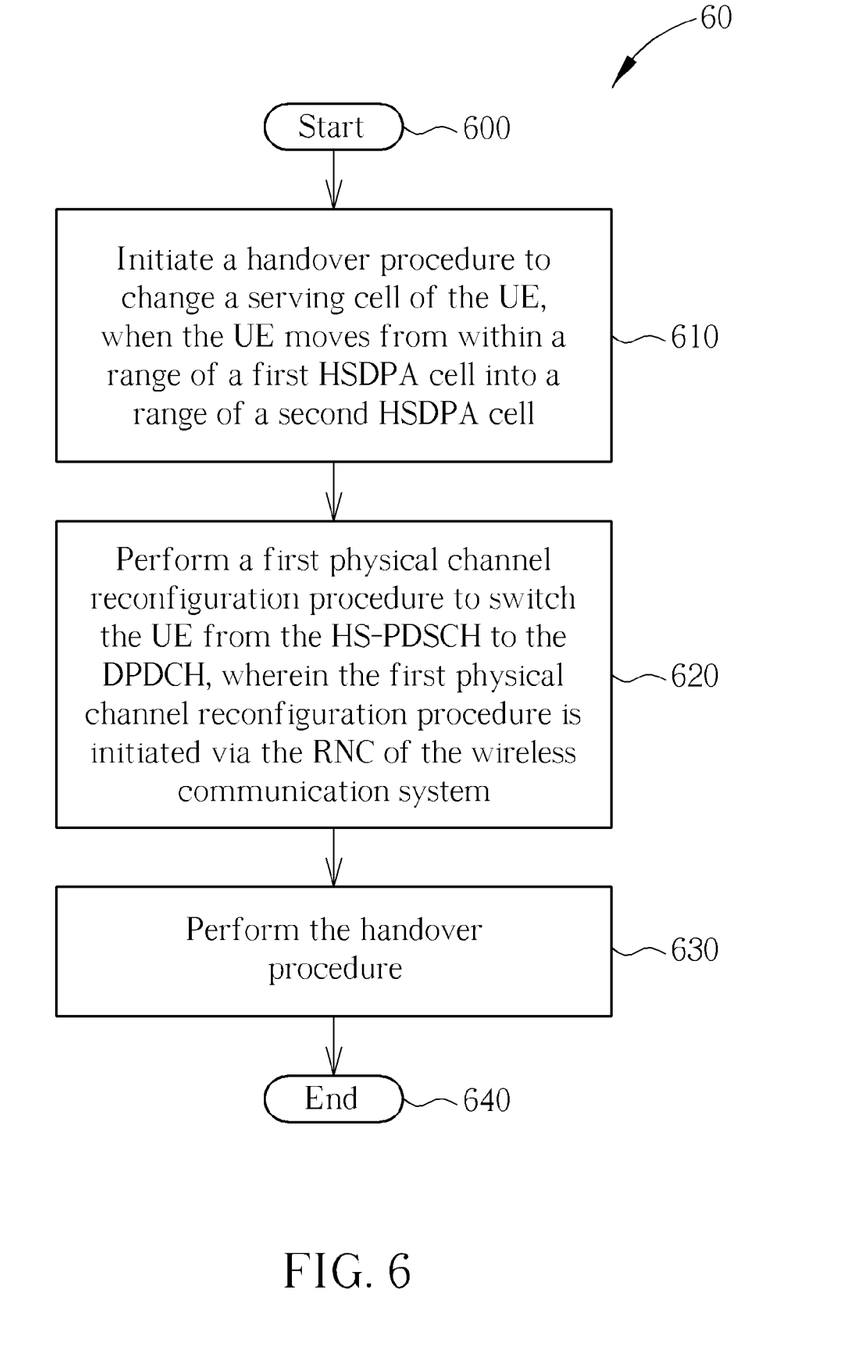
FIG. 6 is a schematic diagram of a process according to an embodiment of the present invention.

Please refer to FIG. 6, which is a schematic diagram of a process 60 according to an embodiment of the present invention. The process 60 is for handling cell change of a UE employing HSDPA technology in a wireless communication system (as shown by the communication device 20 in FIG. 4). The process 60 may be compiled into a program code 214, including the following steps:

Step 600: Start.

Step 610: Initiate a handover procedure to change a serving cell of the UE, when the UE moves from within a range of a first HSDPA cell into a range of a second HSDPA cell.

Step 620: Perform a first physical channel reconfiguration procedure to switch the UE from the HS-PDSCH to the DPDCH, wherein the first physical channel reconfiguration procedure is initiated via the RNC of the wireless communication system.

Step 630: Perform the handover procedure.

Step 640: End.

According to the process 60, when intending to perform serving cell change, the UE first switches from the HS-PDSCH to the DPDCH, and then performs the handover procedure to change the serving cell. More specifically, since the DPDCH is managed by the Radio Network Controller (RNC), the RNC can simultaneously control multiple base stations to transmit data to the UE, i.e. the UE may concurrently receive data transmitted from a serving base station and a target base station. In other words, the handover procedure performed by the UE over the DPDCH is a soft handover. Therefore, data transmission propagation delays and interruptions caused by the handover procedure may be avoided, thereby enhancing communication quality.

The following examples are based on the process 60. Please refer to FIG. 7, which is a sequence diagram of a cell change procedure with RRC signaling according to an embodiment of the present invention. When the UE moves from within a range of an HSDPA cell A into a range of an HSDPA cell B, and a measured signal strength of the cell B reaches an addition window, the UE transmits a measurement report 1a associated with the cell B to the RNC. The cells A and B do not belong to a same base station; also, the base stations to which the cells A and B belong may be of a same or a different RNC. After receiving the measurement report 1a, the RNC initiates the first physical channel reconfiguration procedure. The UE then receives a first Physical channel Reconfiguration message transmitted from the RNC, to reconfigure the physical channel from the HS-PDSCH to the DPDCH. When reconfiguration from the HS-PDSCH to the DPDCH is complete, the UE transmits a first Physical channel Reconfiguration complete message to the RNC. Note that, the UE performs the handover procedure to change the serving cell after its physical channel is switched to the DPDCH. Therefore, the handover procedure performed by the UE is a soft handover (descriptions of soft handovers can be found in the above, and are not iterated here). Furthermore, the cells A and B do not belong to the same base station; therefore, the handover procedure performed by the UE is an inter-Node B handover procedure.

Figure 7:
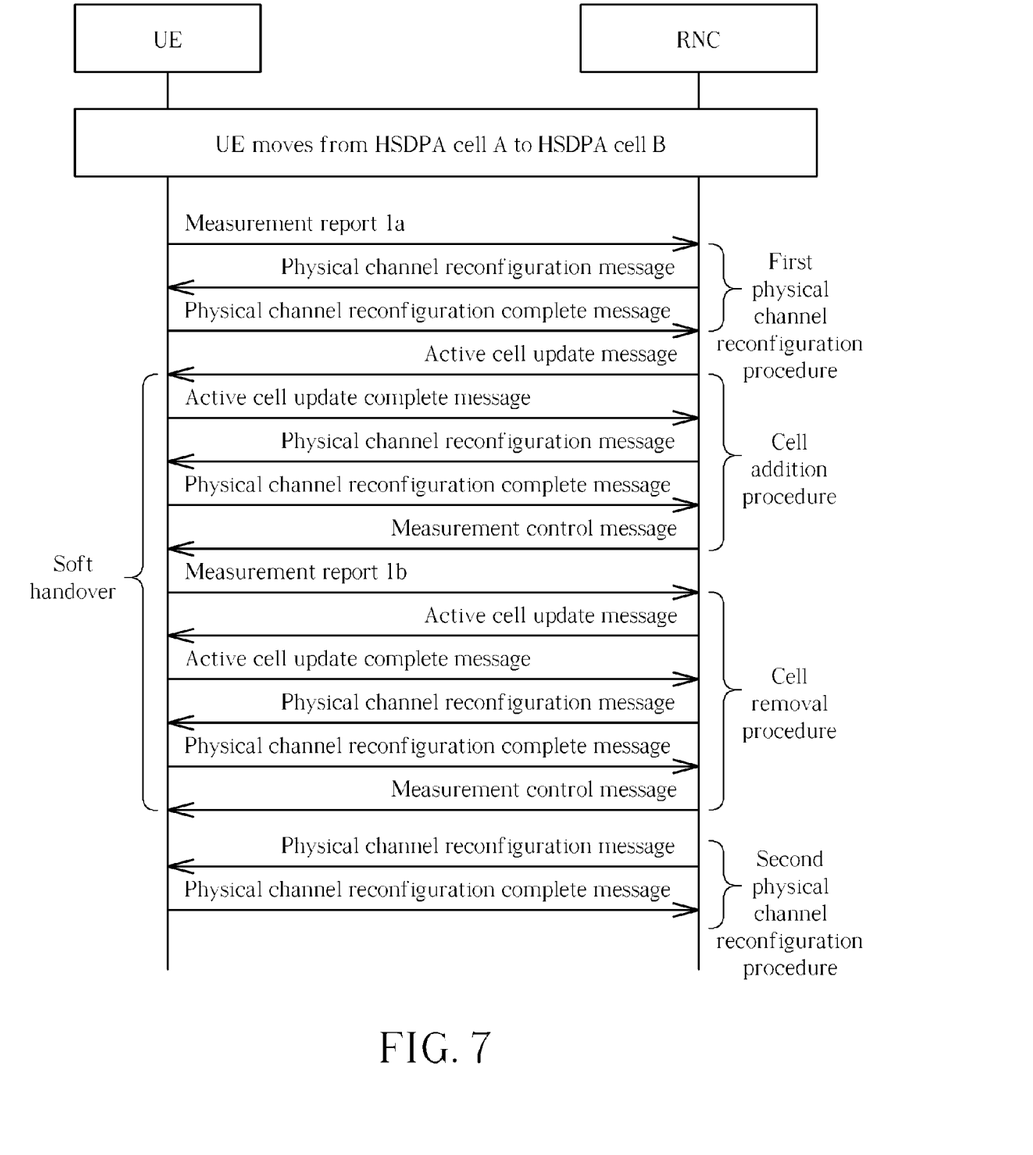
FIG. 7 is a sequence diagram of a cell change procedure with RRC signaling according to an embodiment of the present invention.

In soft handover, the UE performs a cell addition procedure corresponding to the cell B, and performs a cell removal procedure corresponding to the cell A. As shown in FIG. 7, when the RNC initiates the cell addition procedure, the UE first receives a first Active cell update message from the RNC to add the cell B to the active set of the UE, wherein the active set includes cells communicating with the UE. After adding the cell B to the active set, the UE transmits a first Active cell update complete message to the RNC. Next, the UE receives a second physical channel reconfiguration message from the RNC, to establish a physical channel corresponding to the cell B. After completing establishment of the physical channel corresponding to the cell B, the UE transmits a second physical channel reconfiguration complete message to the RNC, and receives a first measurement control message from the RNC to update a neighbor list information in the UE, thus completing the cell addition procedure. After completing the cell addition procedure, the UE performs the cell removal procedure corresponding to the cell A. The UE first transmits a measurement report 1b associated with the cell A to the RNC, to indicate the RNC to release the physical channel between the cell A and the UE. Next, the UE receives a second active cell update message from the RNC, to remove the cell A from the active set. After removing the cell A from the active set, the UE transmits a second active cell update complete message to the RNC. After receiving the second active cell update complete message, the RNC transmits a second physical channel reconfiguration message to the UE, to release the physical channel corresponding to the cell A. After releasing the physical channel corresponding to the cell A, the UE transmits a second physical channel reconfiguration complete message to the RNC. Finally, the UE receives a second measurement control message from the RNC to update the neighbor list information, thus completing the cell removal procedure.

Furthermore, after the UE completes the soft handover procedure, the RNC switches the physical channel from the DPDCH back to the HS-PDSCH, such that the UE maintains high speed data transmission in the HSDPA system. As shown in FIG. 7, during the second physical channel reconfiguration procedure, the UE receives a third physical channel reconfiguration message from the RNC, to reconfigure the physical channel from the DPDCH to the HS-PDSCH. After completion of reconfiguration from the DPDCH to the HS-PDSCH, the UE transmits a third physical channel reconfiguration complete message to the RNC.

In contrast with the prior art which performs cell change via hard handover, the present invention performs cell change via soft handover, such that it is possible to concurrently receive data from multiple base stations during the handover. Therefore, data transmission propagation delays and interruptions caused by the handover procedure may be avoided. Moreover, according to the present invention, neither the UE nor the network requires modification or addition of hardware device.

Figure 8:
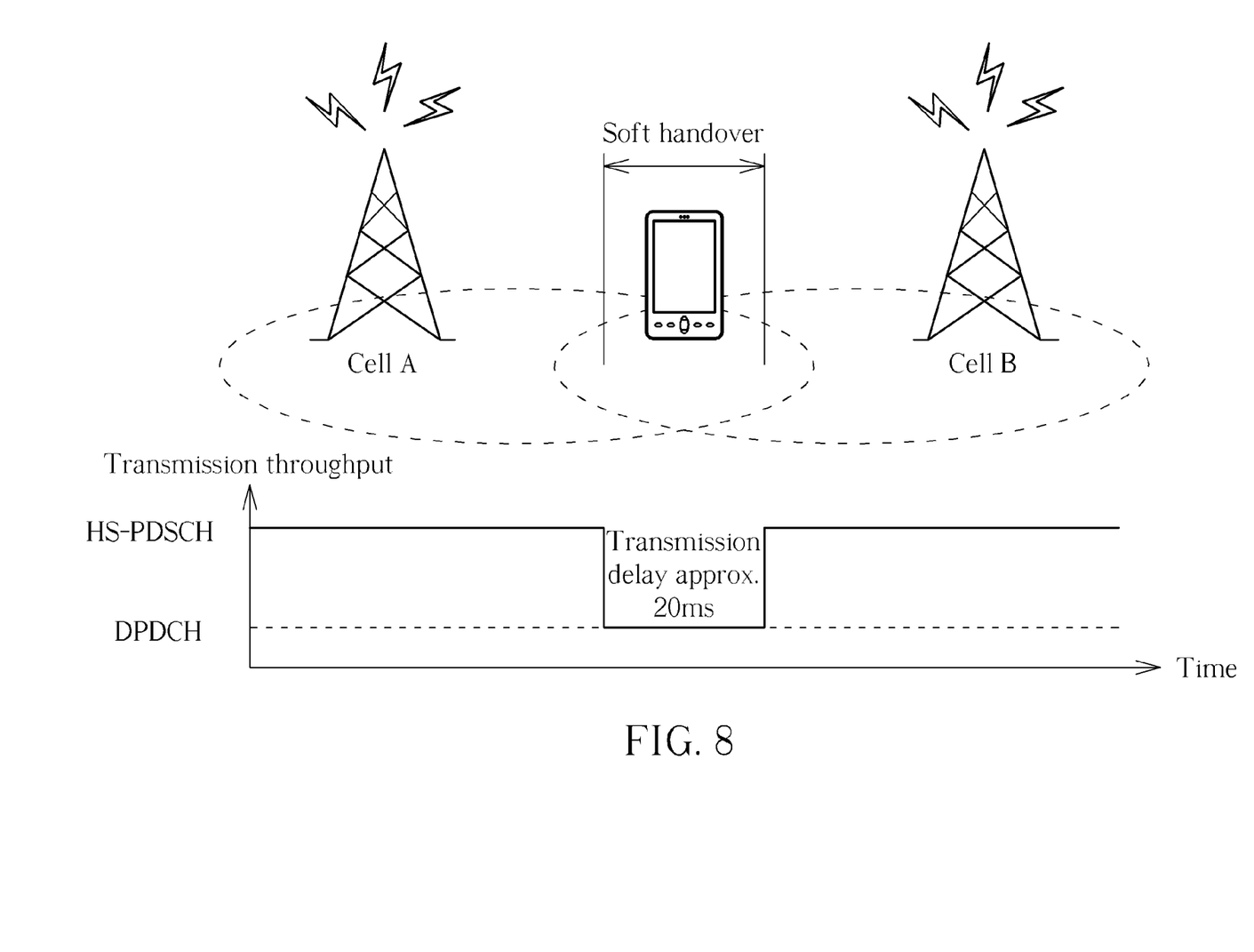
FIG. 8 is a schematic diagram of a relationship between transmission throughput and time of a soft handover procedure according to an embodiment of the present invention.

Furthermore, please refer to FIG. 8, which is a schematic diagram of a relationship between transmission throughput and time of the soft handover procedure, according to an embodiment of the present invention. As shown in FIG. 8, during the soft handover, data transmission over the DPDCH is maintained, and data transmission delay caused by the soft handover is about 20 ms. Therefore, during the handover, the UE is able to maintain data transmission conditions required for various network communication services, e.g. Voice over Internet Protocol (VoIP) or Video Telephony over IP, etc., and thus communication quality is effectively enhanced.

Figure 9:
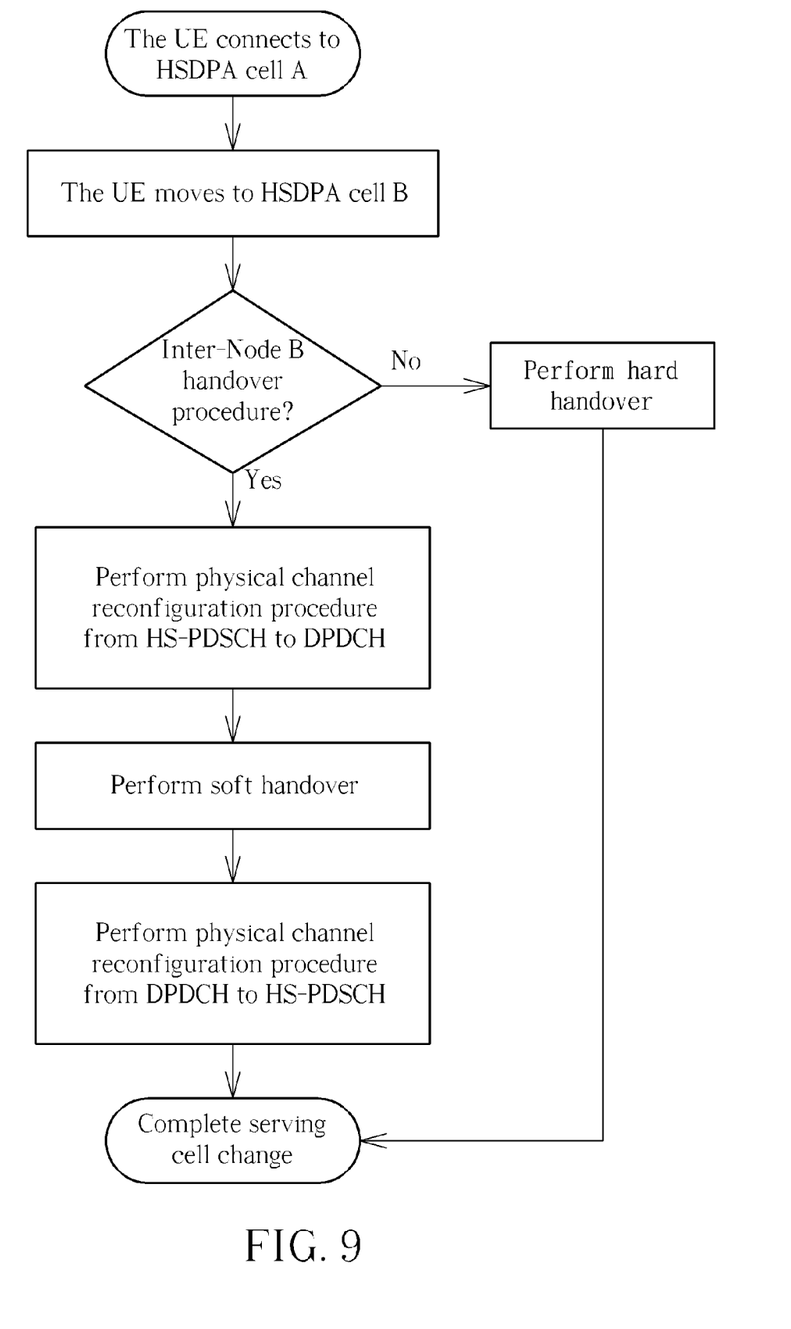
FIG. 9 is a schematic diagram of a serving cell change process according to an embodiment of the present invention.

In short, the present invention can be summarized into a serving cell changing process, as shown in FIG. 9. The UE connects to the HSDPA cell A, and performs data transmission with the cell A. When the UE moves to the HSDPA cell B, the UE initiates the handover procedure. Before performing the handover procedure to change the serving cell, the UE determines whether to initiate an inter-Node B handover procedure according to base stations to which the cells A and B belong. If the cells A and B do not belong to the same base station, the UE first performs the physical channel reconfiguration procedure from the HS-PDSCH to the DPDCH initiated by the RNC. Next, the UE performs the inter Node B handover procedure from the cell A to the cell B. After completing the inter-Node B handover procedure, the UE then performs the physical channel reconfiguration procedure from the DPDCH to the HS-PDSCH initiated by the RNC, to complete the serving cell change. Conversely, if cells A and B belong to the same base station, the UE can directly perform an intra-Node B handover procedure and complete the serving cell change.

Figure 10:
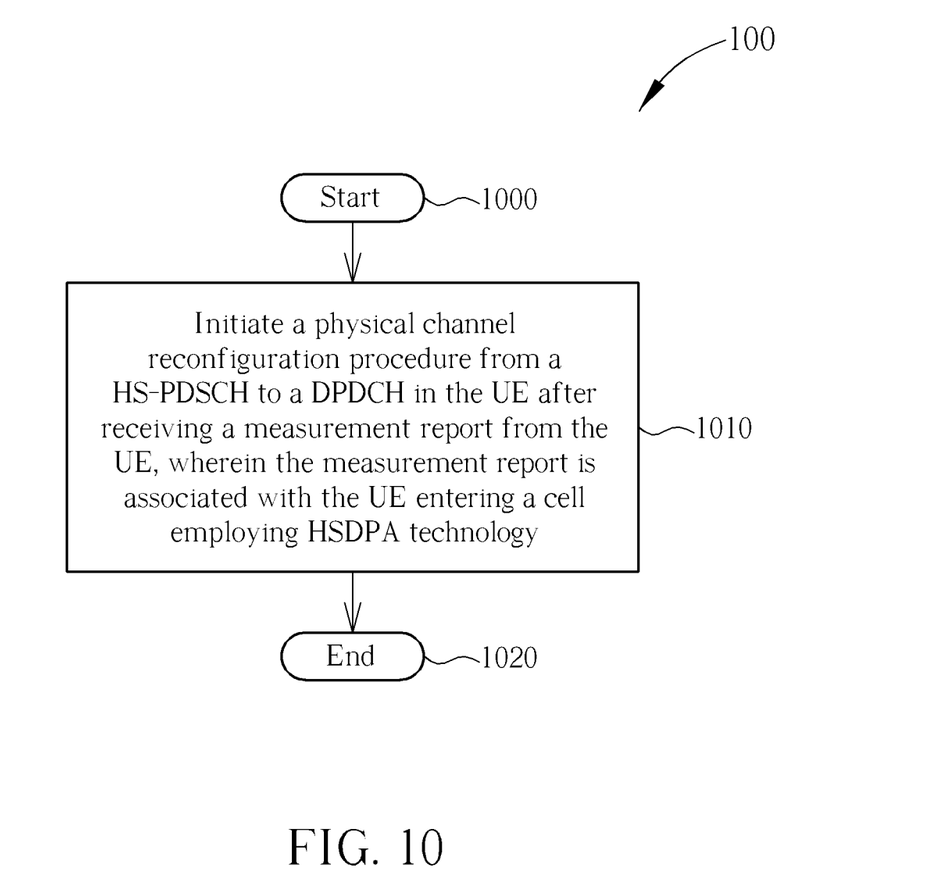
FIG. 10 is a schematic diagram of a process according to an embodiment of the present invention.

On the other hand, please refer to FIG. 10, which is a schematic diagram of a process 100 according to an embodiment of the present invention. The process 100 is for the RNC employing HSDPA technology in a wireless communication system (e.g. the communication device 20 shown in FIG. 4), and for processing the cell change procedure of the UE. The process 100 may be compiled into the program code 214, and includes the following steps:

Step 1000: Start.

Step 1010: Initiate a physical channel reconfiguration procedure from a HS-PDSCH to a DPDCH in the UE after receiving a measurement report from the UE, wherein the measurement report is associated with the UE entering a cell employing HSDPA technology.

Step 1020: End.

According to the process 100, when entering a range of another cell outside of the serving cell, the UE transmits the measurement report to the RNC. After receiving the measurement report, the RNC initiates a physical channel reconfiguration procedure to switch the UE from the HS-PDSCH to the DPDCH. Therefore, the UE may perform cell change procedure via soft handover. Please refer to the above for details of the process 100.

Note that, the above-mentioned steps may be implemented via hardware, firmware (i.e. a combination of hardware and computer commands, wherein data in the hardware is read-only software data) or electronic systems, etc. Hardware implementations may include analog, digital and mixed circuits (i.e. micro-electronic circuits, microchips or silicon chips). Electronic systems may include systems-on-chip (SOC), systems-in-package (Sip), computer-on-module (COM), and the communication device 20.

In summary, an embodiment of the present invention allows the UE to change the serving cell utilizing soft handover via switching its physical channel from the HS-PDSCH to the DPDCH. This eliminates problems such as data transmission interruption or delay caused by the handover. Moreover, to implement serving cell change procedure for the UE via soft handover, the present invention only needs to modify protocols in the RRC layer of the UE and the RNC, without having to add new hardware to the UE or the network.

Those skilled in the art will readily observe that numerous modifications and alterations of the device and method may be made while retaining the teachings of the invention.

What is claimed is:

1. A method for handling cell change in a wireless communication system employing High Speed Downlink Package Access (HSDPA) technology, comprising:

initiating a handover procedure to change a serving cell of a mobile device when the mobile device moves from a first HSDPA cell into a second HSDPA cell;

performing a first physical channel reconfiguration procedure from a High Speed Physical Downlink Shared Channel (HS-PDSCH) to a Dedicated Physical Data Channel (DPDCH), wherein the first physical channel reconfiguration procedure is initiated via a Radio Network Controller (RNC) of the wireless communication system; and performing the handover procedure after performing the first physical channel reconfiguration procedure;

wherein performing the handover procedure comprises performing a cell addition procedure corresponding to the second HSDPA cell, and steps of performing the cell addition procedure corresponding to the second HSDPA cell comprise:

adding the second HSDPA cell to an active set of the mobile device, wherein the active set includes cells communicating with the mobile device, when receiving a first active cell update message from the RNC;

transmitting a first active cell update complete message to the RNC when addition of the second HSDPA cell to the active set is complete;

establishing a physical channel corresponding to the second HSDPA cell, when receiving a second physical channel reconfiguration message from the RNC;

transmitting a second physical channel reconfiguration complete message to the RNC, after establishment of the physical channel corresponding to the second HSDPA cell is complete; and updating a neighbor list information in the mobile device, when receiving a first measurement control message from the RNC.

2. The method of claim 1, wherein the first HSDPA cell and the second HSDPA cell do not belong to the same base station; and the handover procedure is an inter Node B handover procedure.

3. The method of claim 1, wherein steps of performing the first physical channel reconfiguration procedure from the HS-PDSCH to the DPDCH comprise:

transmitting a first measurement report associated to the second HSDPA cell to the RNC when a measurement signal corresponding to the second HSDPA cell reaches to a cell addition window;

reconfiguring the HS-PDSCH to the DPDCH when receiving a first physical channel reconfiguration message from the RNC; and transmitting a first physical channel reconfiguration complete message to the RNC after reconfiguration of the HS-PDSCH to the DPDCH is complete.

4. The method of claim 1, wherein steps of performing the handover procedure further comprise:

performing a cell removal procedure corresponding to the first HSDPA cell.

5. The method of claim 4, wherein steps of performing the cell removal procedure corresponding to the first HSDPA cell comprise:

transmitting a second measurement report pertaining to the first cell to the RNC, to indicate the RNC to release the first cell and the physical channel of the mobile device;

removing the first cell in the active set, when receiving a second active cell update message from the RNC;

transmitting a second active cell update complete message to the RNC, when removal of the first cell in the active set is complete;

releasing a physical channel corresponding to the first cell when receiving a second physical channel reconfiguration message from the RNC;

transmitting a second physical channel reconfiguration complete message to the RNC when release of the physical channel corresponding to the first cell is complete; and updating the neighbor list information, when receiving a second measurement control message from the RNC.

6. The method of claim 1, further comprising:
performing a second physical channel reconfiguration procedure from the DPDCH to the HS-PDSCH, wherein the second physical channel reconfiguration procedure is initiated via the RNC.

7. The method of claim 6, wherein steps of performing the second physical channel reconfiguration procedure from the DPDCH to the HS-PDSCH comprise:
reconfiguring the DPDCH to the HS-PDSCH, when receiving a third physical channel reconfiguration message from the RNC; and
transmitting a third physical channel reconfiguration complete message to the RNC, after reconfiguration of the DPDCH to the HS-PDSCH is complete.

8. A wireless communication system employing High Speed Downlink Package Access (HSDPA) technology, comprising:
a computer readable storage medium, for storing a program code corresponding to a process; and
a processor, coupled to the computer readable storage medium, for processing the program code to execute the process;
wherein the process comprises:
initiating a handover procedure to change a serving cell of a mobile device when the mobile device moves from a first HSDPA cell into a second HSDPA cell;
performing a first physical channel reconfiguration procedure from a High Speed Physical Downlink Shared Channel (HS-PDSCH) to a Dedicated Physical Data Channel (DPDCH), wherein the first physical channel reconfiguration procedure is initiated via a Radio Network Controller (RNC) of the wireless communication system; and
performing the handover procedure after performing the first physical channel reconfiguration procedure;
wherein performing the handover procedure comprises performing a cell addition procedure corresponding to the second HSDPA cell, and steps performing the cell addition procedure corresponding to the second HSDPA cell comprises:
adding the second HSDPA cell to an active set of the mobile device, wherein the active set includes cells communicating with the mobile device, when receiving a first active cell update message from the RNC;
transmitting a first active cell update complete message to the RNC when addition of the second HSDPA cell to the active set is complete;
establishing a physical channel corresponding to the second HSDPA cell, when receiving a second physical channel reconfiguration message from the RNC;
transmitting a second physical channel reconfiguration complete message to the RNC, after establishment of the physical channel corresponding to the second HSDPA cell is complete; and
updating a neighbor list information in the mobile device, when receiving a first measurement control message from the RNC.

9. The mobile device of claim 8, wherein the first HSDPA cell and the second HSDPA cell do not belong to the same base station; and the handover procedure is an inter Node B handover procedure.

10. The mobile device of claim 8, wherein steps of performing the first physical channel reconfiguration procedure from the HS-PDSCH to the DPDCH comprise:
transmitting a first measurement report associated to the second HSDPA cell to the RNC when a measurement signal corresponding to the second HSDPA cell reaches to a cell addition window;
reconfiguring the HS-PDSCH to the DPDCH when receiving a first physical channel reconfiguration message from the RNC; and
transmitting a first physical channel reconfiguration complete message to the RNC after reconfiguration of the HS-PDSCH to the DPDCH is complete.

11. The mobile device of claim 8, wherein steps of performing the handover procedure comprise:
performing a cell removal procedure corresponding to the first HSDPA cell.

12. The mobile device of claim 11, wherein steps of performing the cell removal procedure corresponding to the first HSDPA cell comprise:
transmitting a second measurement report pertaining to the first HSDPA cell to the RNC, to indicate the RNC to release the first HSDPA cell and the physical channel of the mobile device;
removing the first HSDPA cell from the active set, when receiving a second active cell update message from the RNC;
transmitting a second active cell update complete message to the RNC, after removal of the first HSDPA cell from the active set is complete;
releasing a physical channel corresponding to the first HSDPA cell, when receiving a second physical channel reconfiguration message from the RNC;
transmitting a second physical channel reconfiguration complete message to the RNC when release of the physical channel corresponding to the first HSDPA cell is complete; and
updating the neighbor list information, when receiving a second measurement control message from the RNC.

13. The mobile device of claim 8, the process further comprising:
performing a second physical channel reconfiguration procedure from the DPDCH to the HS-PDSCH, wherein the second physical channel reconfiguration procedure is initiated via the RNC.

14. The mobile device of claim 13, wherein steps of performing the second physical channel reconfiguration procedure from the DPDCH to the HS-PDSCH comprise:
reconfiguring the DPDCH to the HS-PDSCH, when receiving a third physical channel reconfiguration message from the RNC; and
transmitting a third physical channel reconfiguration complete message to the RNC, after reconfiguration of the DPDCH to the HS-PDSCH is complete.

15. A wireless communication system employing High Speed Downlink Package Access (HSDPA) technology, comprising:
a handover initiation device, for initiating a handover procedure to change a serving cell of a mobile device when the mobile device moves from a first HSDPA cell into a second HSDPA cell;
a first channel reconfiguration device, for performing a first physical channel reconfiguration procedure from a High Speed Physical Downlink Shared Channel (HS-PDSCH) to a Dedicated Physical Data Channel (DPDCH), wherein the first physical channel reconfiguration procedure is initiated via a Radio Network Controller (RNC) in the wireless communication system; and
a cell change device, for performing the handover procedure after performing the first physical channel reconfiguration procedure; wherein the cell change device for performing the handover procedure comprises a cell addition device for performing a cell addition procedure corresponding to the second HSDPA cell, and the cell addition device for performing the cell addition procedure corresponding to the second HSDPA cell comprises:
- an active cell addition device, for adding the second HSDPA cell to an active set of the mobile device, wherein the active set includes cells communicating with the mobile device, when receiving a first active cell update message from the RNC;
- a first transmission device, for transmitting a first active cell update complete message to the RNC when addition of the second HSDPA cell to the active set is complete;
- a physical channel establishing device, for establishing a physical channel corresponding to the second HSDPA cell, when receiving a second physical channel reconfiguration message from the RNC;
- a second transmission device, for transmitting a second physical channel reconfiguration complete message to the RNC, after establishment of the physical channel corresponding to the second HSDPA cell is complete; and
- a first update device, for updating a neighbor list information in the mobile device, when receiving a first measurement control message from the RNC.

16. The wireless communication systems of claim 15, wherein the first HSDPA cell and the second HSDPA cell do not belong to the same base station; and the handover procedure is an inter Node B handover procedure.

17. The wireless communication systems of claim 15, wherein the first channel reconfiguration device for performing the first physical channel reconfiguration procedure from the HS-PDSCH to the DPDCH comprises:
- a first measurement reporting device, for transmitting a first measurement report associated to the second HSDPA cell to the RNC when a measurement signal corresponding to the second cell reaches to a cell addition window;
- a first physical channel reconfiguration device, for reconfiguring the HS-PDSCH to the DPDCH when receiving a first physical channel reconfiguration message from the RNC; and
- a transmission device, transmitting a first physical channel reconfiguration complete message to the RNC after reconfiguration of the HS-PDSCH to the DPDCH is complete.

18. The wireless communication systems of claim 15, wherein the cell change device for performing the handover procedure comprises:
- a cell removal device, for performing a cell removal procedure corresponding to the first HSDPA cell.

19. The wireless communication systems of claim 18, wherein the cell removal device for performing a cell removal procedure corresponding to the first HSDPA cell comprises:
- a second measurement reporting device, transmitting a second measurement report pertaining to the first HSDPA cell to the RNC, to indicate the RNC to release the first HSDPA cell and the physical channel of the mobile device;
- an active cell removal device, for removing the first HSDPA cell from the active set, when receiving a second active cell update message from the RNC;
- a third transmission device, for transmitting a second active cell update complete message to the RNC, after removal of the first HSDPA cell from the active set is complete;
- a physical channel releasing device, for releasing a physical channel corresponding to the first HSDPA cell, when receiving a second physical channel reconfiguration message from the RNC;
- a fourth transmission device, for transmitting a second physical channel reconfiguration complete message to the RNC when release of the physical channel corresponding to the first HSDPA cell is complete; and
- a second update device, for updating the neighbor list information, when receiving a second measurement control message from the RNC.

20. The wireless communication systems of claim 15, further comprising:
- a second channel reconfiguration device, for performing a second physical channel reconfiguration procedure from the DPDCH to the HS-PDSCH, wherein the second physical channel reconfiguration procedure is initiated via the RNC.

21. The wireless communication systems of claim 20, wherein the second channel reconfiguration device for performing the second physical channel reconfiguration procedure from the DPDCH to the HS-PDSCH comprises:
- a second physical channel reconfiguration device, for reconfiguring the DPDCH to the HS-PDSCH, when receiving a third physical channel reconfiguration message from the RNC; and
- a fifth transmission device, for transmitting a third physical channel reconfiguration complete message to the RNC, after reconfiguration of the DPDCH to the HS-PDSCH is complete.

* * * * *